J. W. CONANT.
DEVICE FOR FASTENING OBJECTS TO VEHICLES.
APPLICATION FILED JULY 23, 1915.

1,191,762. Patented July 18, 1916.

Inventor
J. W. Conant

Witnesses

UNITED STATES PATENT OFFICE.

JOHN W. CONANT, OF MONTOYA, NEW MEXICO.

DEVICE FOR FASTENING OBJECTS TO VEHICLES.

1,191,762.  Specification of Letters Patent.  Patented July 18, 1916.

Application filed July 23, 1915. Serial No. 41,571.

*To all whom it may concern:*

Be it known that I, JOHN W. CONANT, a citizen of the United States, residing at Montoya, in the county of Quay and State of New Mexico, have invented certain new and useful Improvements in Devices for Fastening Objects to Vehicles; and I do hereby declare the following to be a full, clear, and exact description of the invention, such as will enable others skilled in the art to which it appertains to make and use the same.

This invention relates to new and useful improvements in fastening devices and has for its object the provision of a device for securing a tank or other object upon the running board of a vehicle, or in other position where it might be subjected to such jars or shocks as to cause an undesired rattling, it being further the object to provide such an attaching means whereby the tank may be readily removed if desired and replaced.

It is more specifically an object of the invention to provide such an attaching means which is exceedingly simple in structure, so as to permit manufacture at a comparatively low cost, and which may readily be associated with the tank or other object to be held and with the running board.

With the above and other objects and advantages in view, the invention resides more particularly in the novel combination and arrangement of parts as more fully described hereinafter and pointed out in the appended claim.

Figure 1:
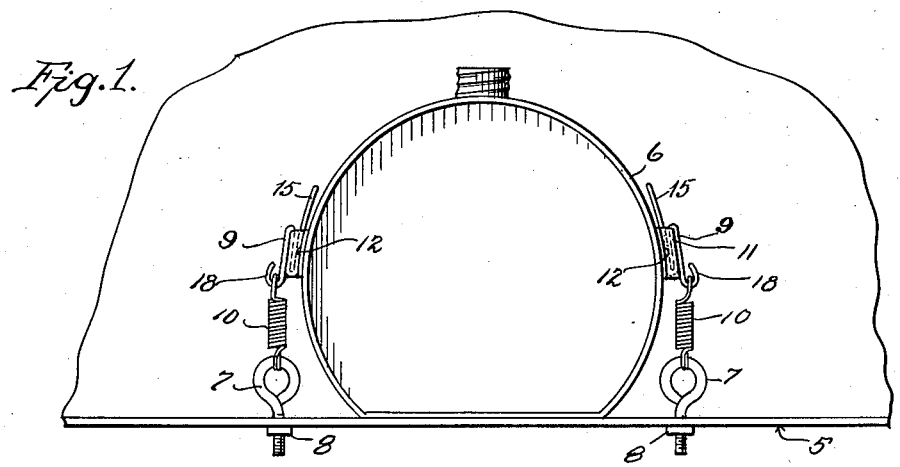
Figure 2:
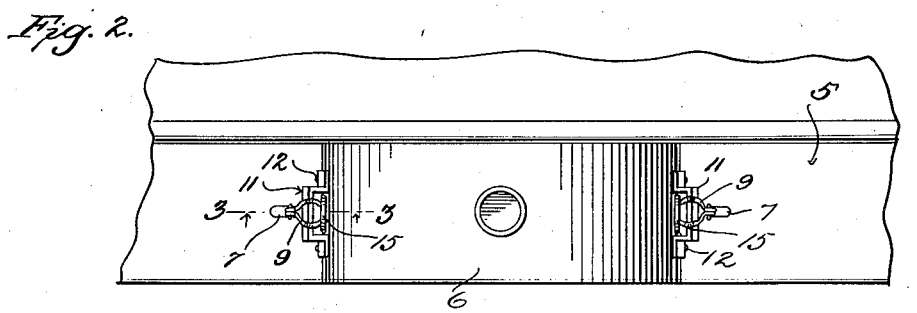
Figure 3:
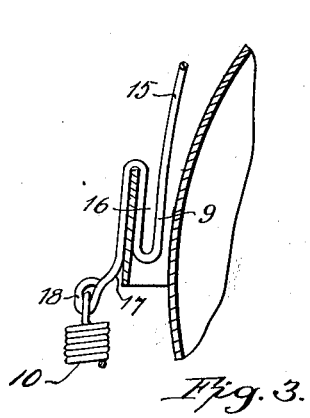
Figure 4:
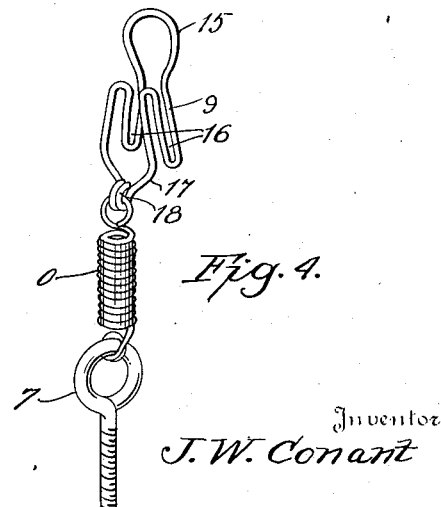

Reference is had to the accompanying drawings, wherein similar characters of reference designate corresponding parts throughout the several views, and in which:

Figure 1 is a side elevation showing the improved securing means holding a tank on the running board of a vehicle; Fig. 2 is a top plan view of what is shown in Fig. 1; Fig. 3 is a sectional view taken on the line 3—3 of Fig. 2; and Fig. 4 is a perspective view of one of the holding members detached from the running board.

Referring now more particularly to the accompanying drawings, 5 designates the running board of a vehicle, and 6 designates a tank positioned thereon, this tank being circular in elevation and having its bottom flattened to seat on the running board. The improved securing means for this tank comprises simply a pair of eye bolts 7 passed through the running board and held thereto by the nuts 8 whereby some degree of adjustment may be had and a pair of hooks 9 having the ends of their shanks connected to the eye bolts by retractile springs 10. The tank carries a pair of socket members on its sides for the bills of the hooks, which socket members comprise each merely a strip 11 of metal having its ends offset and secured as at 12 to the tank.

Each of the hooks 9 is preferably formed of a single length of wire having its central portion bent in the form of an eye 15 to provide a grip member by which the hook may be readily grasped and removed from the socket member. The ends of the wire are then extended in divergent relation from the eye 15 and then bent backwardly to provide suitable bill portions 16, the latter bends terminating short of the said eye 15 while the wires are again returned upon themselves and converged and terminate in eyes 18 for receiving the end of the spring 10.

Thus an exceedingly simple device has been provided whereby the tank is held against rattling by being resiliently urged against the running board. The tank may be readily removed by simply unhooking one of the hooks from its respective socket member.

What I claim is:

A securing device of the class described comprising a hook member formed of a single length of wire centrally bent in eye form to provide a grip and the material outwardly of said eye being extended divergently and then bent back and terminating short of the eye to form a bill and the wire from thence extended back again toward the free end of the bill, a securing member and a retractile spring connecting the last named portion of the hook and the said securing member.

In testimony whereof, I affix my signature, in the presence of two witnesses.

JOHN W. CONANT.

Witnesses:
 JACK CURRY,
 CHAS. DIENSTBACH.